(12) United States Patent
Perkal et al.

(10) Patent No.: US 11,538,038 B2
(45) Date of Patent: Dec. 27, 2022

(54) SYSTEMS AND METHODS FOR REMOTE DETECTION OF COMPUTER DEVICE ATTRIBUTES

(71) Applicant: PAYPAL, INC., San Jose, CA (US)

(72) Inventors: Yotam Perkal, Beer Sheva (IL); Yuri Shafet, Beer Sheva (IL)

(73) Assignee: PayPal, Inc., San Jose, CA (US)

( * ) Notice: Subject to any disclaimer, the term of this patent is extended or adjusted under 35 U.S.C. 154(b) by 592 days.

(21) Appl. No.: 16/428,339

(22) Filed: May 31, 2019

(65) Prior Publication Data

US 2020/0380522 A1    Dec. 3, 2020

(51) Int. Cl.
| | |
|---|---|
| *G06Q 20/40* | (2012.01) |
| *H04L 9/40* | (2022.01) |
| *G06F 9/54* | (2006.01) |
| *G06F 21/57* | (2013.01) |
| *G06F 21/56* | (2013.01) |

(52) U.S. Cl.
CPC ......... *G06Q 20/4016* (2013.01); *G06F 9/547* (2013.01); *G06F 21/566* (2013.01); *G06F 21/577* (2013.01); *H04L 63/1416* (2013.01); *H04L 63/1433* (2013.01)

(58) Field of Classification Search
CPC . H04L 63/1441; H04L 63/1416; H04L 63/10; H04L 63/145; G06F 21/56; G06F 21/55; G06F 21/577; G06F 13/107; G06F 16/38; G06F 11/0757
See application file for complete search history.

(56) References Cited

U.S. PATENT DOCUMENTS

| | | | |
|---|---|---|---|
| 9,137,210 B1 * | 9/2015 | Joglekar | H04L 63/061 |
| 9,230,105 B1 * | 1/2016 | Satish | G06F 21/64 |
| 10,298,599 B1 * | 5/2019 | Zhang | H04L 67/42 |
| 10,542,030 B2 * | 1/2020 | Oberheide | H04L 63/20 |
| 10,567,419 B2 * | 2/2020 | Hansen | H04L 63/1441 |
| 10,623,426 B1 * | 4/2020 | Yumer | G06N 20/10 |
| 2007/0101433 A1 * | 5/2007 | Louch | G06F 21/577 |
| | | | 726/25 |
| 2010/0218253 A1 * | 8/2010 | Sutton | G06F 21/554 |
| | | | 726/23 |
| 2010/0268834 A1 * | 10/2010 | Eidelman | H04L 41/5009 |
| | | | 709/230 |
| 2011/0185421 A1 * | 7/2011 | Wittenstein | H04L 63/1416 |
| | | | 726/22 |

(Continued)

*Primary Examiner* — Tae K Kim
(74) *Attorney, Agent, or Firm* — Haynes and Boone, LLP

(57) ABSTRACT

Methods and systems are presented for assessing a veracity of device attributes obtained from a computer device based on estimating a number of processing cycles used by the computer device to perform a particular function. In response to receiving a transaction request from the computer device, software programming instructions are transmitted to the computer device for obtaining device attributes of the computer device. The software programming instructions may also include code that estimate a number of processing cycles used by the computer to perform a particular function. The particular function may be associated with obtaining at least one of the device attributes of the computer device. The estimated number of processing cycles may be compared against a benchmark profile. A risk associated with the transaction request is determined based on the comparing.

20 Claims, 5 Drawing Sheets

(56) References Cited

U.S. PATENT DOCUMENTS

| | | | |
|---|---|---|---|
| 2011/0302653 A1* | 12/2011 | Frantz | H04L 63/1408 726/22 |
| 2012/0036576 A1* | 2/2012 | Iyer | H04L 63/1441 726/30 |
| 2013/0047149 A1* | 2/2013 | Xu | H04L 67/02 717/175 |
| 2013/0073853 A1* | 3/2013 | Ford | G06F 21/71 713/168 |
| 2013/0205385 A1* | 8/2013 | Roesner | G06F 21/6245 726/17 |
| 2013/0247030 A1* | 9/2013 | Kay | G06F 8/60 717/178 |
| 2014/0047544 A1* | 2/2014 | Jakobsson | G06F 21/566 726/23 |
| 2015/0096020 A1* | 4/2015 | Adams | H04L 63/1458 726/23 |
| 2015/0163121 A1* | 6/2015 | Mahaffey | H04W 12/12 707/687 |
| 2015/0281318 A1* | 10/2015 | Warner | G06F 16/95 709/217 |
| 2015/0293755 A1* | 10/2015 | Robins | G06F 9/44526 717/104 |
| 2015/0373045 A1* | 12/2015 | Ford | G06F 21/71 726/26 |
| 2016/0028746 A1* | 1/2016 | Tonn | H04L 63/145 726/24 |
| 2016/0048834 A1* | 2/2016 | Kurian | G06Q 20/3823 705/44 |
| 2016/0080355 A1* | 3/2016 | Greenspan | H04L 63/08 726/7 |
| 2016/0149887 A1* | 5/2016 | Katmor | H04L 63/0263 726/1 |
| 2016/0173507 A1* | 6/2016 | Avrahami | G06F 21/563 726/23 |
| 2016/0306974 A1* | 10/2016 | Turgeman | G06F 21/121 |
| 2017/0013012 A1* | 1/2017 | Hansen | G06F 21/31 |
| 2017/0054702 A1* | 2/2017 | Turgeman | G06F 3/04883 |
| 2017/0091450 A1* | 3/2017 | Turgeman | G06F 21/32 |
| 2017/0237766 A1* | 8/2017 | Mattson | G06F 21/554 726/23 |
| 2018/0103047 A1* | 4/2018 | Turgeman | H04L 63/08 |
| 2018/0219889 A1* | 8/2018 | Oliner | G06N 3/04 |
| 2019/0005501 A1* | 1/2019 | Tolpin | G06F 21/50 |
| 2019/0065743 A1* | 2/2019 | Shibahara | G06F 16/00 |
| 2019/0197550 A1* | 6/2019 | Sharma | G06N 3/08 |
| 2019/0236608 A1* | 8/2019 | Formsma | G06Q 20/4016 |
| 2019/0347407 A1* | 11/2019 | Beskrovny | H04L 63/1466 |
| 2020/0076842 A1* | 3/2020 | Zhou | G06N 3/0454 |
| 2020/0134141 A1* | 4/2020 | Ford | G06F 21/44 |
| 2020/0402063 A1* | 12/2020 | Tolpin | G06F 21/566 |

* cited by examiner

SYSTEMS AND METHODS FOR REMOTE DETECTION OF COMPUTER DEVICE ATTRIBUTES

BACKGROUND

The present specification generally relates to remote detection of computer device attributes, and more specifically, to determining a veracity of attributes obtained from a computer device according to various embodiments of the disclosure.

RELATED ART

With the advent of the Internet and mobile technologies, users can now comfortably conduct electronic transactions (e.g., electronic payment transactions, etc.) using their computer devices remotely at any location. However, the ease of conducting electronic transactions also gives rise to a challenge of providing a secured environment for users to conduct electronic transactions. For example, sensitive information, such as credit card data, is often stolen (e.g., from phishing sites and/or from data breaches at merchant servers), and subsequently traded among a group of fraudsters known as carders. The stolen credit card data may then be used by malicious users to perform unauthorized transactions online, sometimes in bulk. As such, online service providers that provide services to users over the Internet are often tasked with protecting users from these unauthorized transactions.

Online service providers may attempt to use device fingerprints to keep track of devices used to conduct suspicious transactions such that subsequent transactions initiated by the same devices may be treated with a higher scrutiny or may be denied. However, malicious users may avoid having their devices fingerprinted by using addons or extensions to their applications (e.g., web browsers) for spoofing fake device data to the online service providers, and it is difficult to detect whether a device includes one or more of the addons or extensions. Thus, there is a need for providing a mechanism to automatically detect device attributes accurately, and additionally, to detect an existence of addons or extensions on a device.

Figure 1:
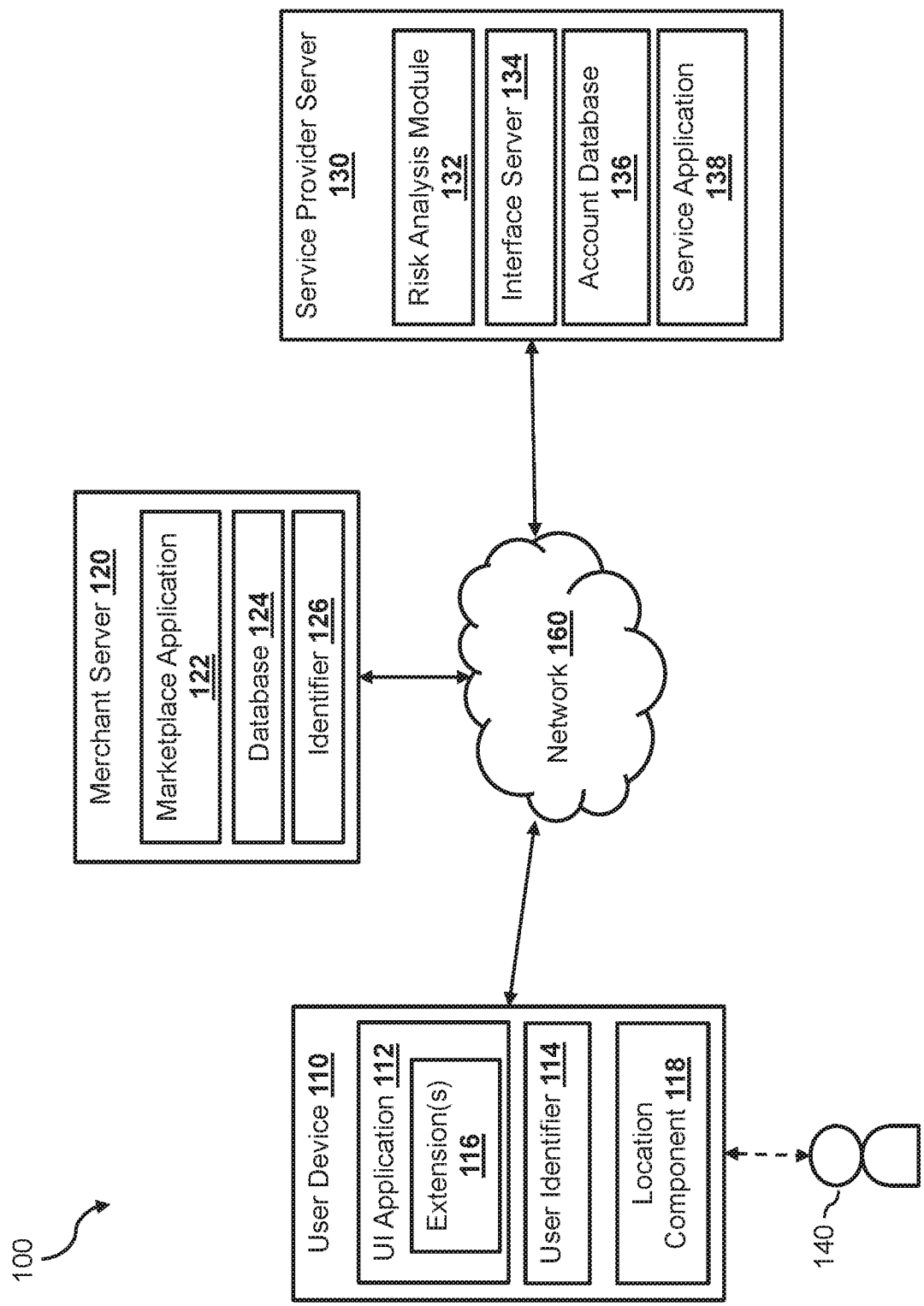
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for determining a veracity of device attributes of a computer device based on estimating a number of processing cycles used by the computer device to perform a particular function. As discussed above, malicious users often configure their computer devices used for conducting unauthorized transactions (e.g., payment transactions using stolen credit card data, etc.) to spoof another device with different device attributes (e.g., fake device attributes). For example, an addon or an extension to an application (e.g., a web browser application) may be installed on the computer device. An addon or an extension to the application is a software module (e.g., including source code the can be complied and executed by the application) that can be added to the application for customizing the application. The addon or extension may be used to modify the user interface of the application, modify content being presented on the application (e.g., advertisement blocking extension), manage cookies, or modify other behavior of the application.

Some malicious addons or extensions may collect data (e.g., user interactions with websites) and transmit the collected data to third-party. Furthermore, some addons or extensions may enable users to log on to multiple accounts with the same service provider at the same time to perform malicious activities. Further yet, some addons or extensions may spoof device attributes of the device. Thus, some addons or extensions may overwrite one or more functions implemented by the application, such that when the one or more functions are executed, code associated with the addon or the extension would be executed instead of, or in addition to, code associated with the application. For example, the one or more functions that are overwritten by the addon or the extension may be associated with an application programming interface (API) provided by the application. Specifically, the one or more functions may be associated with providing device attributes, such as a browser type of the web browser application, a version of the web browser application, a screen resolution of the computer device, an operating system running on the computer device, an Internet Protocol (IP) address associated with the computer device, a device identity (e.g., a MAC address, etc.) or other attributes of the computer device. External devices (external to the computer devices) may request for device attributes of the computer device by calling the one or more functions.

For example, the API provided by the application may be called by code that is executed (or rendered) by the application. In a specific, but not limiting example, a webpage generated (or hosted) by a server (e.g., a server associated with an online service provider) external to the computer device may include software programming code that can be downloaded to the computer device for execution (or rendering) by the application of the computer device. The software programming code may include an API function call of the application, which is associated with requesting for device attributes of the computer device. The device attributes may then be used by the webpage or the online service provider to determine a device fingerprint of the computer device. When the application executes (or renders) the website including the software programming code, the application may execute the one or more functions associated with the API function call.

Under a normal circumstance where no addons or extensions are installed on the computer device that overwrite the one or more functions, the application may execute code to retrieve the device attributes (e.g., either from the application itself, from other applications, or from an operating system running on the computer device, etc.), and may return the device attributes as an output to the webpage. The webpage (and/or the server that hosts the webpage) may then use the obtained device attributes to perform other functions, such as to authenticate the computer device, authenticate a user of the computer device, authorize a transaction, etc.

However, if an addon or an extension has been installed on the computer device, the addon or the extension may overwrite the one or more functions associated with the API function call. For example, the addon or the extension may include code (e.g., written in JavaScript® or any type of programming language usable by the application) that provides an alternative implementation of the one or more function calls. By overwriting the one or more functions, the application may execute the code associated with the addon or the extension, instead of (or in addition to) executing the native code associated with the application. As such, instead of returning the actual device attributes of the computer device, the one or more function calls may return fake device attributes to the website based on the implementation of the addon or extension. As a result, the webpage may not be able to obtain the actual device attributes of the computer device and may not be able to determine an accurate device fingerprint of the computer device.

In some embodiments, the addon or the extension may be configured to dynamically generate different fake device attributes (e.g., configurable by a user of the computer device). Thus, a malicious user may use the computer device to perform multiple unauthorized transactions with a webpage based on stolen data, such as credit card data, where the addon or extension may be configured to provide different sets of device attributes to the webpage for each unauthorized transaction. Even though the webpage may implement a security protocol that tracks device attributes of devices that conduct transactions with the online service provider (e.g., by calling the API function calls with the application), the webpage may not be able to identify the computer device used to conduct the unauthorized transactions or determine patterns of the unauthorized transactions since the one or more functions return different fake device attributes during each authorized transaction. From the perspective of the online service provider, based on the fake device attributes obtained from the addon or the extension, the multiple unauthorized transactions all seem to be conducted using different devices.

Thus, according to various embodiments of the disclosure, a risk analysis system may remotely detect device attributes of a computer device and determine a veracity of the device attributes by estimating a number of processing cycles used by the computer device to perform one or more predetermined functions. In some embodiments, the risk analysis system may embed, within software programming code to be executed (and/or rendered) by an application of a computer device, an API function call associated with the application. The API function call may be associated with a request for device attributes of the computer device. For example, when the application is a web browser, the risk analysis system may embed the API function call within the software programming code associated with a webpage of an online service provider. When the application of the computer device downloads and executes (and/or renders) the website (e.g., based on a request to view the website, for example, by submitting a Universal Resource Locator (URL), etc.), the application may execute one or more functions associated with the API function call. In some embodiments, the application may retrieve the requested device attributes from another application or the operating system running on the computer device, and may return the requested device attributes as one or more return values of the API function call to the risk analysis system. The device attributes may include, but are not limited to, a browser type of the web browser application, a version of the web browser application, a screen resolution of the computer device, an operating system running on the computer device, an Internet Protocol (IP) address associated with the computer device, a device identifier (e.g., a MAC address, etc.) or other attributes of the computer device. In some embodiments, the risk analysis system may generate a device fingerprint of the computer device based on the obtained device attributes. The risk analysis system may then use the device fingerprint to perform other functionalities, such as to authenticate the computer device, authenticate a user of the computer device, authorize a transaction, etc.

However, as discussed above, an addon or an extension to the application may be installed on the computer device that overwrites the one or more functions. For example, if the computer device is operated by a malicious user to perform unauthorized transactions, the malicious user may install the addon or the extension (e.g., a fingerprint spoofing addon or extension) configured to provide fake device attributes to the risk analysis system by overwriting the one or more functions. By overwriting the one or more functions and providing the fake device attributes, the addon or the extension may "fool" the risk analysis system into believing that the computer device is a different computer device having another set of device attributes. Furthermore, based on the fake device attributes, the risk analysis system may not be able to generate an accurate device fingerprint for the computer device, and may not be able to perform the authentication and transaction authorization properly. For example, based on the fake device attributes, the risk analysis system may mistakenly authenticate the computer device (or the user of the computer device) or mistakenly authorize transactions initiated by the computer device based on the fake device attributes when the computer device (or the user of the computer device) should not be authenticated or the transactions should not be authorized.

Thus, it is crucial for the risk analysis system to determine the veracity of the device attributes obtained from the application of the computer device before generating the device fingerprint and performing the authentication and/or authorization functionalities. However, it is a challenge to determine whether the computer attributes received from the application of the computer device represent accurate device information of the computer device. For example, there is often no practical method for a webpage to remotely determine whether an addon or an extension to the application has been installed on the computer device.

In some embodiments, the risk analysis system may determine a veracity of the device attributes received from the application of the computer device (or a presence of an addon or extension) based on an estimated number of processing cycles used by the application of the computer device to perform a function. Since executing the addon or the extension may change the number of processing cycles required for the application to perform the function (e.g., the application needs to initiate the addon and process the code included in the addon, etc.), the risk analysis system may use the information related to the number of processing cycles used by the computer device to perform the function to determine whether the function was overwritten by an addon or an extension. In some embodiments, the function may be associated with the one or more functions for providing the device attributes to the risk analysis system.

Since different computer configurations, such as different hardware components (e.g., a number of processors (or processor cores), a type of the processor, etc.) used by the computer devices, different operating systems running on the computer devices, and/or different types of applications executing (or rendering) the software programming codes of the website (e.g., different web browsers) may potentially affect the numbers of processing cycles used by the computer device to perform the function, the risk analysis system may first determine different processing cycle benchmark profiles for the different computer configurations. Each computer configuration may correspond to a particular combination of hardware component(s), operating system, and application type(s) (e.g., a type of web browser such as a particular version of a web browser, etc.). For example, testing devices may be configured based on the different computer configurations, and may be used to determine (or estimate) the number of processing cycles used to perform the function in a test environment. In the test environment, the testing devices having the different computer configurations may be configured to perform the function in an isolated environment such that no other applications or processes (other than those essential for operating the devices, such as core operating system processes) are running on the testing devices. In some embodiments, since the number of processing cycles may directly correlate to time (e.g., the greater the number of processing cycles, the longer the time, etc.), estimating the number of processing cycles used by a device to perform the function may include determining an amount of time used by the device to perform the function. Thus, each testing device corresponding to a particular computer configuration may be configured to first perform the particular function in the test environment. The time used by each testing device to perform the particular function may be measured and added to the benchmark profile as a clean benchmark associated with the particular computer configuration.

One or more malicious addons or extensions may be known to be used by hackers alike to conduct unauthorized transactions. As such, in addition to measuring the time used by the device to perform the particular function, each of the one or more known malicious addons or extensions to an application may be installed on the testing devices. For each known malicious addon or extension, the testing device may perform the particular function with the known addon or extension running. The times used by the testing device to perform the particular function with each of the known addon or extension running may also be measured and added to the benchmark profile as malicious benchmarks associated with the particular computer configuration. Thus, in some embodiments, the benchmark profile associated with each particular computer configuration may include a clean benchmark for performing the particular function without any addons or extensions, and one or more malicious benchmarks for performing the particular function with one or more known addons or extensions running on the device.

To avoid variance caused by unexpected processes (e.g., hidden or background processes of the operating system, etc.) running at the time the testing device performs the function, the testing device may be configured to perform the function multiple times (e.g., 50 times, 100 times, etc.).

In some embodiments, the risk analysis system may determine the benchmark for the computer configuration based on the measured times (e.g., an average of the measured times, a mean, a median, etc.) that the testing device used to perform the function. In some embodiments, the benchmark that the risk analysis system determines for a computer configuration may include a range of time (e.g., the minimum time and the maximum time that the device used to perform the function over the multiple times). Thus, the risk analysis system may determine a first benchmark (e.g., 0.4 milliseconds-0.6 milliseconds) for a first computer configuration (e.g., Intel i5® processor, Windows® operating system, Internet Explorer® web browser version 10), and a second benchmark (e.g., 0.3 milliseconds-0.5 milliseconds) for a second computer configuration (e.g., Intel Core i7® processor, Mac® operating system, and Safari® web browser version 12.1). The risk analysis system may use the same method to determine benchmark profiles for all available or known computer configurations.

Once the benchmark profiles for the different computer configurations are determined, the risk analysis system may use the benchmark profiles to detect whether any addons or extensions (or which addon/extension) are installed on a computer device for providing fake device attributes. For example, the risk analysis system of some embodiments may embed additional code into the software programming code associated with one or more webpages of an online service provider. The additional code may be configured to, when executed by the application of the computer device, determine a configuration of the computer device (e.g., a combination of hardware components, operating system, and application type of the application that executes the code) and estimate the number of processing cycles used (or the amount of time used by the processor) for the computing device to perform a particular function. In some embodiments, the particular function corresponds to an API function call to the application that executes (and/or renders) the website. For example, the additional code may include the API function call, which may be used for obtaining one or more device attributes of the computer device. In some embodiments, the additional code may also include a timer for estimating an amount of time that the computer device takes to perform the particular function.

Thus, when the website is downloaded and executed (and/or rendered) by the application of the computer device, the application may perform the particular function (e.g., to retrieve or otherwise obtain one or more device attributes), and determine an amount of time that was used by the computer device to perform the particular function. However, since the risk analysis system does not have control over the computer device and does not have knowledge about other application(s) and/or process(es) that are running on the computer device at the time the particular function was performed, the determined (or estimated) amount of time may be affected by the other application(s) and/or process(es) that are concurrently running when the particular function was performed. In order to reduce the influences of these uncontrollable elements, the additional code that the risk analysis system embeds into the website may be configured to cause the application to perform the particular function multiple times (e.g., 10 times, 50 times, 100 times). Every time the application performs the particular function, the additional code is configured to also record the amount of time that the computer device takes to perform the particular function.

The more times that the application performs the process, the more accurate is the estimated time for executing the particular function. However, performing the process too many times may also cause delay for the application to render the website for the user. Thus, the risk analysis system may determine the number of times that the application should perform the time estimation when loading the website based on a number of factors such as a risk associated with a transaction being conducted via the webpage (e.g., a log-in transaction, a payment transaction, and amount of payment involved in the payment transaction, etc.), a location of the computer device, a user profile associated with a user of the computer device, etc. As such, the higher the risk associated with the transaction (e.g., when the webpage is for logging-in a user to a user account, for performing a high value transaction, etc.), the greater number of times the risk analysis system would require the application to perform the time estimation.

The webpage may also include code for sending the information (including the configuration of the computer device, the one or more device attributes, and the estimated time(s) that the computer device performs the particular function). When the risk analysis system receives the information from the application, the risk analysis system may access the benchmark profile corresponding to the computer configuration of the computer device. The risk analysis system may also determine whether the estimated time(s) obtained from the application corresponds to one or more of the benchmarks included in the benchmark profile.

For example, if only a single estimated time is obtained from the application, the risk analysis system may determine whether the estimated time is within a predetermined deviation threshold (e.g., within 10% deviation, 15% deviation, 20% deviation, etc.) of any one of the clean benchmarks in the benchmark profile. If the application is required to perform the time estimation multiple times, the risk analysis system may first determine a value or a range that corresponds to the obtained estimated times. For example, the risk analysis system may perform one or more statistical analysis on the estimated times, such as calculating a mean time, a median time, a minimum time, a time range that includes a predetermined percentage (e.g., 90%, 85%, etc.) of the obtained estimated times, etc. based on the obtained estimated times. The risk analysis system may then determine whether the value or the range corresponds to any one of the benchmarks in the benchmark profile.

If the risk analysis system determines that the obtained estimated time(s) corresponds to a clean benchmark in the benchmark profile, the risk analysis system may determine that the particular function was not overwritten by any addon or extension, and thus the device attributes obtained from the application are trustworthy. The risk analysis system may reduce the risk level associated with the transaction of the webpage, or may authorize the transaction. However, if the risk analysis system determines that the obtained estimated time(s) does not correspond to the clean benchmark (e.g., deviates from the clean benchmark by a predetermined amount (e.g., 10%, 20%, 30%, etc.), the risk analysis system may determine that the particular function may have been overwritten by an addon or an extension, and thus, the device attributes obtained from the application may not be trustworthy. The risk analysis system may then raise a risk level associated with the transaction request.

As discussed above, in some embodiments, the benchmark profile may also include one or more malicious benchmarks (corresponding to one or more known malicious addons or extensions). Thus, if it is determined that the benchmark profile includes one or more malicious benchmarks (in addition to the clean benchmark), the risk analysis system may also determine whether the obtained estimated time(s) corresponds to any one of the malicious benchmarks in the benchmark profile. If the obtained estimated time(s) corresponds to any one of the malicious benchmarks in the benchmark profile, the risk analysis system may determine that a malicious addon or extension has been used to provide the device attributes. Thus, the risk analysis system may increase the risk level associated with the transaction of the website by a first amount, or even deny the transaction.

If the risk analysis system determines that the obtained estimated time(s) does not correspond to any one of the malicious benchmarks in the benchmark profile, the risk analysis system may determine that an addon or an extension has been used by the application of the computer device while the computer device was performing the particular function. However, the type of addon or extension used by the application may or may not be malicious. Thus, the risk analysis system may still raise the risk level associated with the transaction of the website (e.g., by a second amount less than the first amount). By estimating the number of processing cycles used by the computer device to perform the function, the risk analysis system can accurately determine whether any addons or extensions are present in the computer device and whether the device attributes obtained from the computer device are trustworthy, which improves the authentication and/or transaction authorization process for the online service provider.

FIG. 1 illustrates an electronic transaction system 100 within which the risk analysis system may be implemented according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via a website hosted by the merchant server 120 or a point-of-sale (POS) system associated with the merchant server 120. The user 140 may also log in to a user account to access account services or conduct electronic transactions (e.g., account transfers or payments) with the service provider server 130. Similarly, a merchant associated with the merchant server 120 may use the merchant server 120 to log in to a merchant account to access account services (e.g., event analysis services as described herein, etc.) or conduct electronic transactions (e.g., payment transactions) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to conduct electronic transactions (e.g., online payment transactions, etc.) with the merchant server 120 and/or the service provider server 130 over the network 160. In one aspect, purchase expenses may be directly and/or automatically debited from an account related to the user 140 via the user interface application 112.

In one implementation, the user interface application 112 may be configured to interface and communicate with the service provider server 130 via the network 160. For example, the user interface application 112 may be implemented, in part, as a web browser to view information available over the network 160. For example, via the user interface application 112, the user 140 may browse webpages associated with the service provider server 130 to perform one or more transactions, such as a login transaction, a payment transaction, a fund transfer transaction, a profile editing transaction, etc. The webpages associated with the service provider server 130 may include code that is executed (and/or rendered) by the user interface application 112. In some embodiments, the webpages may include code corresponding to API calls of the user interface application 112, for example, for obtaining device attributes (e.g., device identifier, IP address, display resolution, application type of the user interface application 112, a location of the user device 110, a device identifier, etc.) of the user device 110. Based on the API calls included in the code of the webpages, the user interface application 112 may execute one or more functions to obtain or otherwise retrieve (e.g., from an operating system running on the user device 110) the device attributes and provide the device attributes to the webpages (e.g., as return values of the API calls).

However, one or more addons or extensions 116 to the user interface application 112 may have been installed on the user device 110. Once the addons or extensions 116 to the user interface application 112 are installed on the user device 110, the addons or extensions 116 may be configured to modify the user interface application 112. For example, the addons or extensions 116 may overwrite one or more functions implemented by the user interface application 112. The one or more functions, in some instances, correspond to the API calls included in the code of the webpages. Thus, when the user interface application 112 executes the one or more functions based on the API calls, the addons or extensions 116 may cause the user interface application 112 to execute code implemented by the addons or extensions 116 in addition to, or instead of, the native code implemented by the user interface application 112. In one example where the addons or extensions 116 are associated with hacker tools configured to spoof device identity (or attributes), the addons or extensions 116 may cause the application to provide fake device attributes, instead of the actual device attributes obtained or retrieved by the user interface application 112, to the caller of the API calls (e.g., the webpages).

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may be one of the device attributes requested by the webpages. Thus, when executing the one or more functions based on the API calls, the user interface application 112 may retrieve the device identifier (e.g., from the registry of the user device 110, from the operating system running on the user device 110, etc.) and provide the device identifier to the webpages.

The user device 110, in various embodiments, includes a location component 118 configured to determine, track, monitor, and/or provide an instant geographical location of the user device 110. In one implementation, the geographical location may include GPS coordinates, zip-code information, area-code information, street address information, and/or various other generally known types of location information. In one example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. Similar to the device identifier, location information produced by the location component 118 may also be one of the device attributes requested by the webpages. Thus, when executing the one or more functions based on the API calls, the user interface application 112 may retrieve the location information of the user device 110 from the location component 118 and provide the device identifier to the webpages.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124. In some embodiments, the merchant server 120 may include a data server 128 that is configured to serve content (e.g., web content) to users and interact with users. For example, the data server 128 may include a web server configured to serve web content in response to HTTP requests. In another example, the data server 128 may include an application server configured to provide an interface on user devices (e.g., the user device 110) that have a corresponding application (e.g., a mobile application associated with the merchant) installed. As such, the data server 128 may include pre-generated content ready to be served to users. For example, the data server 128 may store electronic pages associated with different items for sale on the website (or the mobile application) of the merchant server 120 and a frequently asked questions (FAQ) electronic page for providing information (e.g., dispute information) to consumers. In some embodiments, the data server 128 may be disposed in a server separate from the merchant server 120 and may be maintained by an entity different from the merchant (as indicated by the dotted line), for example, the merchant may contract with a third-party host for hosting the website (or the mobile application) of the merchant.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as a payment intermediary between customers of the merchant and the merchant itself. For example, the merchant server 120 may use an application programming interface (API) that allows it to offer sale of goods or services in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. The merchant may also have an account with the service provider server 130. Even though only one merchant server 120 is shown in FIG. 1, it has been contemplated that one or more merchant servers (each similar to merchant server 120) may be communicatively coupled with the service provider server 130 and the user device 110 via the network 160 in the system 100.

The service provider server 130, in one embodiment, may be maintained by a transaction processing entity or an online service provider, which may provide electronic transaction services for the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other electronic transaction services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content (e.g., webpages) in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. At least some of the pages (e.g., webpages) served to users are associated with electronic transactions. For example, the interface server 134 may store a log-in page (e.g., log-in webpage) and is configured to serve the log-in page to users for logging into user accounts of the users to access various services provided by the service provider server 130. The interface server 134 may also store a payment page (e.g., a payment webpage) and is configured to serve the payment page to users for conducting electronic payment transactions. As a result, a user may access a user account associated with the user and access various electronic services offered by the service provider server 130, by generating HTTP requests directed at the service provider server 130.

In various embodiments, the service provider server 130 includes a risk analysis module 132 that implements the risk analysis system as discussed herein. The risk analysis module 132 is configured to assess a risk associated with a user device (and transactions initiated/requested by the user device) based on device attributes obtained from the user device. For example, the risk analysis module 132 may embed additional code for obtaining device attributes into one or more of the webpages stored by the interface server 134, such that the additional code may be executed by the user interface application 112 when the webpages are served to the user interface application 112. Furthermore, to assess the veracity of the device attributes obtained from the user device 110, the additional code embedded into the webpages by the risk analysis module 132 may also cause the user interface application 112 to estimate a time used by the user device 110 to perform a function (e.g., a function for obtaining the device attributes). Based on the estimated time used by the user device 110 to perform the function, the risk analysis module 132 may determine whether an addon or an extension (or which addon or extension) to the user interface application 112 has been installed on the user device 110. If the risk analysis module 132 determines that one or more addons or extensions have been installed on the user device 110 based on the estimated time, the risk analysis module 132 may deem the device attributes received from the user device 110 untrustworthy, and may increase the risk level associated with the user 140, the user device 110, and/or the transactions initiated/requested by the user 140 via the user device 110. The risk analysis module 132 (or another module within the service provider server 130) may then determine to authorize or deny a transaction initiated by the user 140 based on the determined risk level.

The service provider server 130, in one embodiment, may be configured to maintain one or more user accounts and merchant accounts in an account database 136, each of which may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account, which may be used by the risk analysis module 132, in addition to the device attributes and the estimated time received from the user device 110, to classify a request and determine whether to authorize or deny a request associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

Figure 2:
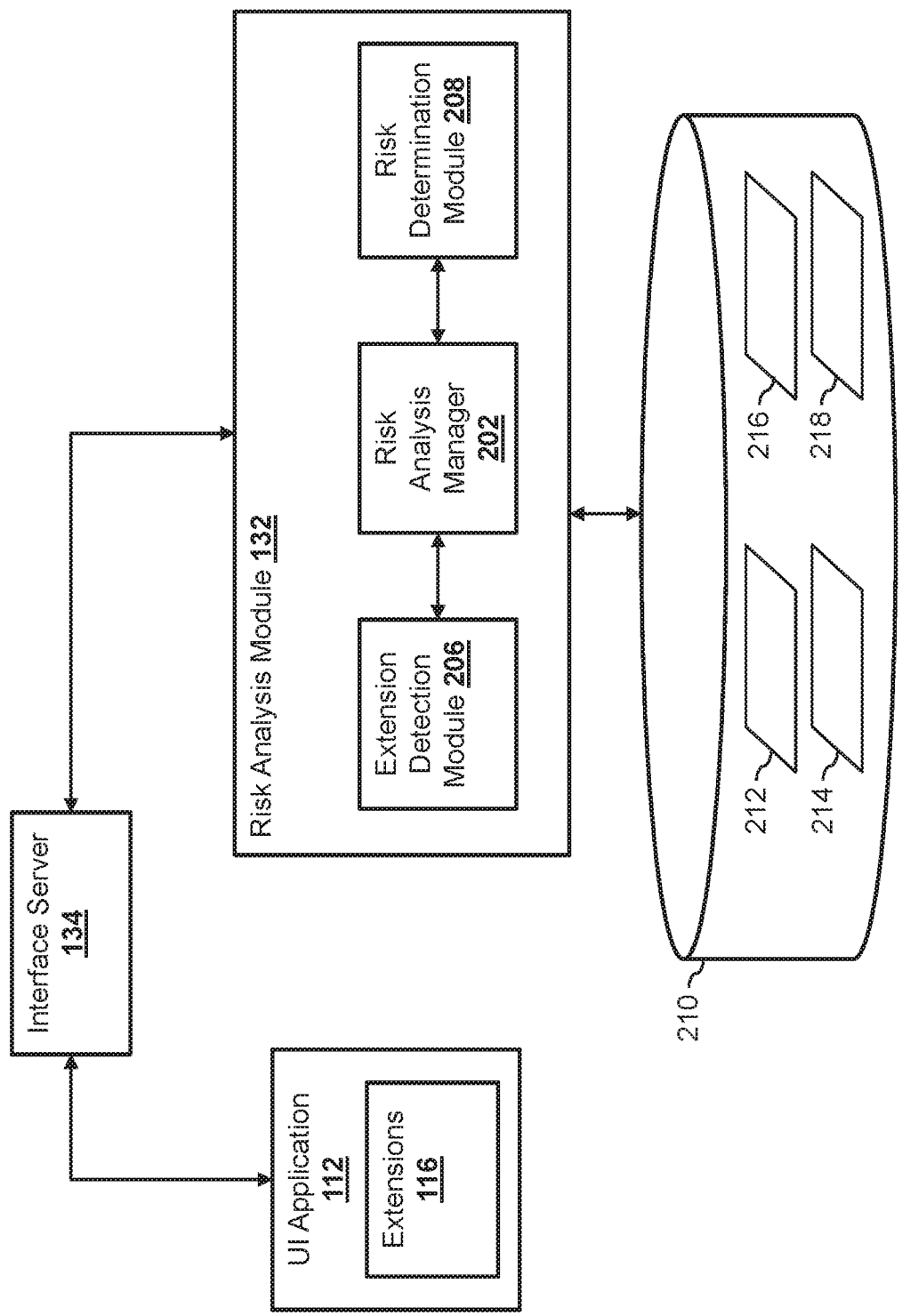
FIG. 2 is a block diagram illustrating a risk analysis module according to an embodiment of the present disclosure.

FIG. 2 illustrates a block diagram of the risk analysis module 132 according to an embodiment of the disclosure. The risk analysis module 132 includes a risk analysis manager 202, an extension detection module 206, and a risk determination module 208. The risk analysis module 132 may be communicatively coupled with a database 210 that stores benchmark profiles (e.g., benchmark profiles 212-218) associated with different computer configurations. Each computer configuration may correspond to a particular combination of a hardware component, an operating system, and an application type. For example, the benchmark profile 212 may be associated with a first computer configuration representing a combination of an Intel i5® processor, Windows® operating system, and Internet Explorer® web browser. The benchmark profile 214 may be associated with a second computer configuration representing a combination of an Intel Core i7® processor, Mac® operating system, and Safari® web browser. The benchmark profile 216 may be associated with a third computer configuration representing a combination of an Intel Core i7® processor, Windows® operating system, and Google Chrome® web browser. The benchmark profile 218 may be associated with a fourth computer configuration representing a combination of an Intel Core i5® processor, Mac® operating system, and Firefox® web browser. While only four benchmark profiles are shown in FIG. 2, it has been contemplated that the database 210 may store as many benchmark profiles as needed for the various available computer configurations. It is also noted that while only single combinations of three computer configurations are discussed, more combinations can also be used for the benchmark profiles, such as two different types of hardware components, one type of operating system, and two types of applications, and/or more types can be used, such as storage size, software version, etc.

In some embodiments, each of the benchmark profiles may include a clean benchmark and one or more malicious extension benchmarks. The clean benchmark of a benchmark profile may indicate a number of processing cycles or a range of processing cycles that a device (having the combination of hardware components, operating systems, and application types associated with the benchmark profile) should use to perform a particular function under normal conditions (e.g., when no addons or extensions overwrite the particular function). To determine the clean benchmark for a benchmark profile, a testing device may be configured according to the corresponding computer configuration (e.g., a combination of a particular hardware component, a particular operating system, and an application of a particular application type). For example, to determine the clean benchmark for the benchmark profile 212, a testing device may be configured to use an Intel i5® processor, a Windows® operating system, and an Internet Explorer® web browser). Software instructions may be provided to the testing device to cause the application (e.g., the web browser) to perform the particular function, and the number of processing cycles used by the device to perform the particular function may be measured. Since it may be difficult to directly measure the number of processing cycles used by the device to perform the particular function, an elapsed time (instead of the number of processing cycles) for the device to perform the particular function may be measured and recorded. In some embodiments, the testing device having the particular computer configuration may be caused to perform the particular function multiple times (e.g., 50 times, 100 times, etc.), and the measured times from performing the particular function may be used to determine the benchmark time or the benchmark time range of the clean benchmark. In some embodiments, an average, a mean, or a median, of the measured times may be used as the benchmark time. Alternatively, the minimum/maximum measured times (or variations of minimum/maximum such as the 95th percentile minimum/maximum, etc.) may be used as the benchmark time range.

As discussed above, certain malicious addons or extensions may be known to be used by hackers for conducting fraudulent activities, such as conducting unauthorized transactions using stolen user credential data or stolen funding source data. Thus, those certain malicious addons may be installed on the testing device to determine the malicious extension benchmarks for a benchmark profile. For example, a particular malicious extension (e.g., a fingerprint block extension) may be installed on the testing device that has been configured according to the computer configuration. The software instructions may again be provided to the testing device to cause the application (e.g., the web browser) with the added extension to perform the particular function, and the number of processing cycles (and/or the amount of time) used by the testing device to perform the particular function may be measured. Similar to determining the clean benchmark, an elapsed time (instead of the number of processing cycles) for the testing device (having the particular extension) to perform the particular function may be measured and recorded. In some embodiments, the testing device may be caused to perform the particular function multiple times (e.g., 50 times, 100 times, etc.), and the measured times from performing the particular function may be used to determine the benchmark time or the benchmark time range of the malicious benchmark. In some embodiments, an average, a mean, or a median, of the measured times may be used as the benchmark time. Alternatively, the minimum/maximum measured times (or variations of minimum/maximum such as the 95th percentile minimum/maximum, etc.) may be used as the benchmark time range.

The benchmark profiles 212-218 may then be used to compare against actual numbers of processing cycles (or actual time) used by computer devices (e.g., the user device 110) to assess a veracity of device attributes obtained from the computer devices. In some embodiments, the risk analysis manager 202 may embed additional code into one or more webpages associated with the interface server 134. The additional code may be implemented using any type of programming language (e.g., JavaScript®) that can be executed by the user interface application 112. The additional code may include API calls associated with various application types for obtaining device attributes of the computer device. For example, the additional code may include a first API call to the user interface application (e.g., the user interface application 112) to obtain an IP address of the computer device, a second API call to the user interface application to obtain a display resolution of the computer device, and a third API call to the user interface application to obtain a device identifier (e.g., a MAC address) of the computer device. The additional code may also include code for determining a configuration of the computer device (e.g., the hardware component, the operating system, and the application type of the user interface application), and code for determining (or estimating) an amount of time used by the computer device to perform the function associated with the API calls. In some embodiments, the additional code may cause the application to measure the time used for the computer device to perform (e.g., execute) the function associated with only one (or only a subset) of the API calls (e.g., the first API call) to reduce variance.

Since the additional code may slow down the webpage being loaded onto the user interface application of the computer device, the risk analysis manager 202 may embed the additional code only into webpages associated with high risk transactions. For example, the risk analysis manager 202 may embed the additional code into webpages associated with high risk transactions such as login transactions, payment transactions, fund transfer transactions, etc. but does not embed the additional code into webpages for presenting non-sensitive or non-private information.

To further reduce variance of the measured time, the additional code embedded by the risk analysis manager 202 may cause the user interface application 112 to execute the function multiple times (e.g., 10 times, 50 times, 100 times, etc.) by incorporating code to loop through the function multiple times in the webpages. Since the risk analysis module 132 has no control over what other application(s) or process(es) that the computer device (e.g., the user device 110) is running concurrently when the particular function is executed, the more times that the function is executed and time measured, the more accurate the measured time represents the actual number of processing cycles used by the user device 110 to execute the function. However, causing the user interface application 112 to repeatedly execute the function may affect the performance (e.g., speed) of rendering the webpage. Thus, in some embodiments, the risk analysis manager 202 may cause the user interface application 112 to execute the function different numbers of times when loading different webpages based on a transaction types associated with the webpages. For example, the risk analysis manager 202 may determine a first number of executions for a first webpage associated with a login transaction, a second number of executions for a second webpage associated with a payment transaction where an amount of the payment transaction is below a predetermined threshold, and a third number of executions (e.g., higher than the second number of executions) for webpages that are associated a payment transaction where an amount of the payment transaction is above the predetermined threshold. Thus, the risk analysis manager 202 may embed different additional code (e.g., that cause the user interface application 112 to execute the function different numbers of times) into different webpages based on the transaction types associated with the webpages.

When a webpage is loaded onto the user interface application 112 (and the additional code is executed by the user interface application), the interface server 134 may obtain the device configuration (e.g., the hardware component, the operating system, and the application type of the user interface application 112 of the user device 110) and the measured time(s) for the user device 110 to execute the function. The interface server 134 may provide the measured time(s) to the risk analysis module 132 to determine a risk associated with the user 140, the user device 110, and/or the transaction associated with the webpage.

In some embodiments, the extension detection module 206 may access a benchmark profile from the benchmark profiles 212-218 stored in the database 210 based on the device configuration of the user device 110. The extension detection module 206 may then determine whether the measured time(s) corresponds to a clean benchmark or anyone of the malicious extension benchmarks of the benchmark profile. The risk determination module 208 may determine a risk associated with the user 140, the user device 110, and/or the transaction associated with the webpage based on whether the measured time(s) corresponds to any one of the benchmark of the benchmark profile.

Figure 3:
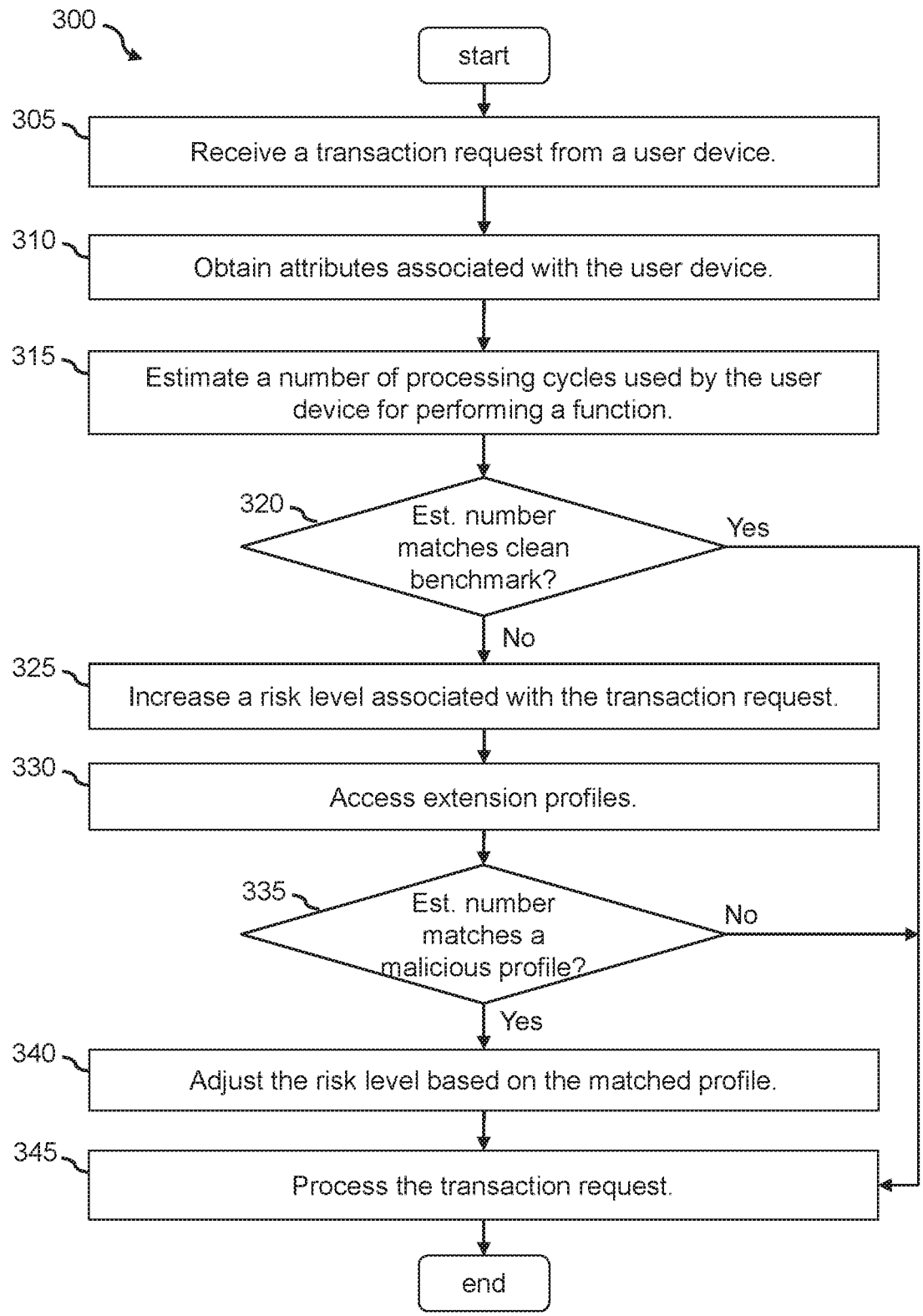
FIG. 3 is a flowchart showing a process of assessing a veracity of device attributes obtained from a computer device according to an embodiment of the present disclosure.

FIG. 3 illustrates a process 300 for assessing a risk of a computer device according to an embodiment of the disclosure. In some embodiments, the process 300 may be performed by the risk analysis module 132 and the interface server 134 of the service provider server. The process 300 begins by receiving (at step 305) a transaction request from a user device. For example, the interface server 134 may receive, from the user interface application 112 of the user device 110, the transaction request via an HTTP request for a particular webpage associated with the service provider server 130. The transaction request may be associated with any one of the transaction services offered by the service provider server 130, such as a log-in transaction request, a payment transaction request, a fund transfer transaction request, a content access request, etc. In some embodiments, the transaction request may be associated with an initial risk level (e.g., a neutral risk level, a risk level assigned by the interface server 134, etc.).

In response to receiving the transaction request, the process 300 obtains (at step 310) device attributes associated with the user device and estimates (at step 315) a number of processing cycles used by the user device for performing (e.g., executing) a function. In some embodiments, in response to receiving the HTTP request from the user device 110, the interface server 134 may transmit a webpage to the user interface application 112 of the user device 110. As discussed herein, the risk analysis manager 202 of some embodiments may embed additional code in one or more of the webpages associated with the service provider server 130. Thus, the additional code embedded in the webpage and transmitted to the user device 110, when executed by the user interface application 112, may cause the user interface application 112 to obtain a device configuration of the user device 110 (e.g., the hardware component on the user device 110, the operating system running on the user device 110, and the application type of the user interface application 112, etc.) and device attributes (e.g., IP address, device identifier, display resolution, etc.) of the user device 110. To obtain the device attributes, the additional code may include API calls associated with the user interface application 112 that cause the user interface application 112 to execute one or more functions (e.g., obtaining or otherwise retrieve the device attributes from other applications such as the operating system of the user device 110).

Furthermore, the additional code may also cause the user interface application 112 to estimate the number of processing cycles used by the user device 110 to execute a particular function. In some embodiments, the particular function is associated with one of the API calls embedded into the webpage for obtaining at least one of the device attributes for the risk analysis module 132. In some embodiments, the additional code causes the user interface application 112 to estimate the number of processing cycles by determining an amount of time taken for the user device 110 to execute the particular function.

Figure 4:
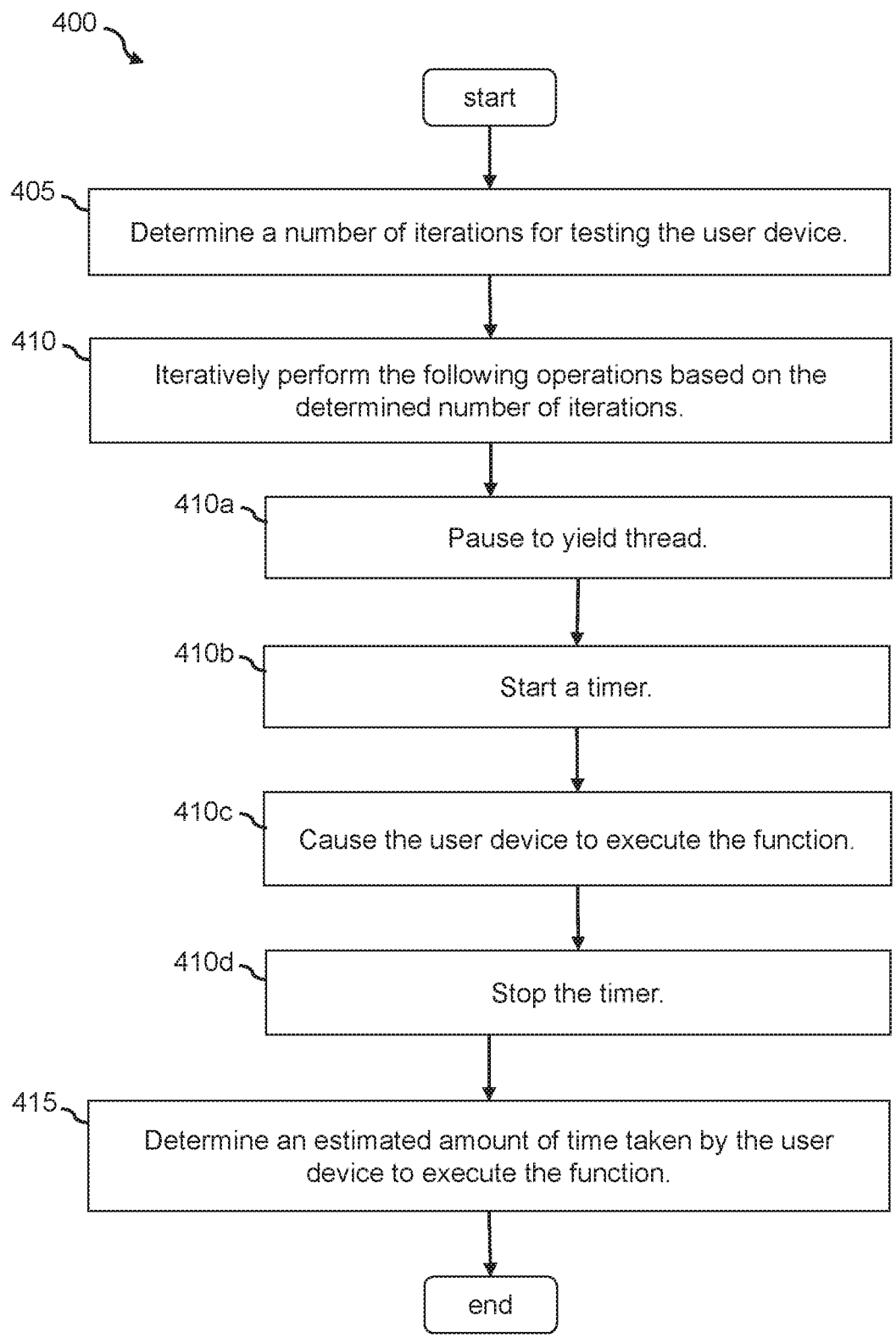
FIG. 4 is a flowchart showing a process of estimating a number of processing cycles used by a computer device to perform a function according to an embodiment of the present disclosure.

FIG. 4 illustrates an example process 400 for estimating the number of processing cycles according to one embodiment of the disclosure. In some embodiments, the process 400 may be implemented within a webpage (e.g., by the risk analysis module 132) and performed by a user interface application when the user interface application executes (and/or renders) the webpage. The process 400 begins by determining (at step 405) a number of iterations for testing the user device. As discussed herein, when the user device loads the webpage and executes the particular function, the user device may have other application(s) and/or process(es) running (e.g., system tasks initiated by the operating system of the user device 110, other applications running on the user device 110, etc.). Those other application(s) and/or process(es) that are running concurrently with the user interface application 112 may affect (e.g., increase, decrease, etc.) the measurement of the time taken by the user device 110 to execute the particular function. However, the risk analysis module 132 (and the webpage being loaded on the user interface application 112) has no control over the other application(s) and/or the process(es). In order to reduce the potential influence by other application(s) and/or process(es), the risk analysis module 132 may configure the webpage (based on the additional code embedded into the webpage) to cause the application to execute the particular function multiple times. The greater the number of iterations that the user device 110 executes the particular function, the more accurate the measurements would be (less likely that the measurements are affected by other concurrently running application(s) and/or process(es)). However, the number of iterations also affects the loading time of the webpage on the user device 110. Thus, in some embodiments, the risk analysis manager 202 may cause the user interface application 112 to execute the particular function different numbers of times (iterations) when loading different webpages based on a transaction types associated with the webpages. For example, the risk analysis manager 202 may determine a first number of executions for a first webpage associated with a login transaction, a second number of executions for a second webpage associated with a payment transaction where an amount of the payment transaction is below a predetermined threshold, and a third number of executions (e.g., higher than the second number of executions) for webpages that are associated a payment transaction where an amount of the payment transaction is above the predetermined threshold. In some embodiments, the risk analysis manager 202 may embed different additional code (e.g., that cause the user interface application 112 to execute the function different numbers of times) into different webpages based on the transaction types associated with the webpages. In other embodiments, the additional code embedded by the risk analysis manager 202 into the webpages may be the same, but the additional code may cause the user interface application 112 to determine the type of transactions associated with the webpage when the webpage is loaded and dynamically determine the number of iterations for executing the particular function based on the transaction type associated with the webpage.

The process 400 then iteratively performs (at step 410) the time measurement of executing the particular function by performing steps 410a-410d. At step 410a, the process pauses to yield the thread. For example, the additional code embedded into the webpage may cause the user interface application 112 to pause and relinquish its use of the processor of the user device 110 (e.g., via a yield function call). This possibly allows the user device 110 to finish executing other processes before returning to execute the particular function for the user interface application 112 to reduce the influence of other application(s) and/or process(es) on the time measurement of executing the particular function.

The process 400 then starts (at step 410b) a timer, causes (at step 410c) the user device to execute the particular function, and stops (at step 410d) the timer. For example, after yielding the thread, the additional code may be configured to initiate and start a timer, make an API call associated with the user interface application 112 for executing the particular function, and stop the timer. The API call may be associated with obtaining one of the device attributes (e.g., the IP address, the device identifier, etc.) from the user interface application 112. The additional code may be configured to record the time measurement of the user device 110 executing the particular function based on the timer. For example, the time measurement may be stored in an array. The process 400 repeats the steps 410a-410d multiple times based on the number of iterations determined at step 405. Thus, multiple time measurements of the user device 110 executing the particular function may be recorded and stored in the array.

The process 400 then determines (at step 415) an estimated amount of time taken by the user device to execute the particular function. For example, the additional code may cause the user interface application 112 to determine an average, a mean, a median, or any other statistical value derived from the array of recorded time measurements. The additional code may cause the user interface application 112 to send the estimated time to the service provider server 130. Alternatively, the additional code may cause the user interface application 112 to send the entire array of time measurements to the service provider server 130. The risk analysis module 132 may determine the estimated time as described herein based on the array of time measurements.

Referring back to FIG. 3, after estimating the number of processing cycles used by the user device to perform the function, the process 300 then determines (at step 320) whether the estimated number of processing cycles matches a clean benchmark. In some embodiments, based on the device configuration of the user device 110, the extension detection module 206 may access a benchmark profile from the database 210 that corresponds to the device configuration of the user device 110. For example, if the extension detection module 206 determines that the user device 110 has an Intel i5® processor, a Windows® operating system, and an Internet Explorer® web browser, the extension detection module 206 may access the benchmark profile 212. The extension detection module 206 may then determine whether the estimated time used by the user device 110 matches the clean benchmark of the benchmark profile 212 (e.g., within a certain percentage, such as 10%, of the clean benchmark, etc.). As discussed herein, the clean benchmark indicates a time that the user device 110 should take for executing the particular function without influence by any addons or extensions. Thus, if the estimated time matches the clean benchmark of the benchmark profile 212, the extension detection module 206 may determine that the user interface application 112 is clean of malicious addons or extensions, and that the device attributes obtained from the user interface application 112 is trustworthy. Thus, the process 300 proceeds to step 345 to process the transaction request. For example, the risk analysis module 132 (and/or other modules of the service provider server 130) may process the transaction request based on the device attributes obtained from the user interface application 112 and the risk level that is pre-assigned to the transaction request. For example, the risk analysis module 132 may generate a device fingerprint for the user device 110 based on the obtained device attributes and send the device fingerprint to the interface server 134. The risk analysis module 132 may also indicate to the interface server 134 that the device fingerprint is trustworthy, and that the interface server 134 may process the transaction request based on the device fingerprint.

However, if it is determined that the estimated time does not match the clean benchmark of the benchmark profile, the process 300 may increase (at step 325) the risk level associated with the transaction request. For example, if the extension detection module 206 determines that the estimated time does not match the clean benchmark of the benchmark profile 212 (e.g., more than 10% outside of the clean benchmark), the extension detection module 206 may determine that one or more addons or extensions may be installed on the user device 110, and that the device attributes may not be trustworthy. Thus, the risk determination module 208 may increase the risk level associated with the transaction request, the user 140, and/or the user device 110.

The process 300 then accesses (at step 330) the extension profiles and determines (at step 335) whether the estimated time matches any one of the malicious extension benchmarks. As discussed herein, each of the benchmark profiles stored in the database 210 may include one or more malicious extension benchmarks. Each malicious extension benchmark corresponds to a known malicious addon or extension (e.g., determined to have been used by hackers to conduct fraudulent activities previously). In other words, each malicious extension benchmark indicates a time (or a time range) for a device having a corresponding malicious addon or extension installed would take to execute the particular function. Thus, the extension detection module 206 may determine whether a particular malicious addon or extension has been installed on the user device 110 by determining whether the estimated time matches any one of the malicious extension benchmarks (e.g., within 10% of any one of the malicious extension benchmarks) of the benchmark profile 212. Other objective determinations of whether there is a match are also possible, including within a time or number threshold, within a variance threshold, etc., which can be based on the type of benchmark.

If it is determined that the estimated time does not match any one of the malicious extension benchmarks of the benchmark profile 212, the risk determination module 208 may determine that none of the known malicious addons or extensions to the user interface application 112 has been installed on the user device 110. Since there is still a possibility that additional processing was performed by one or more addons or extensions when the user interface application 112 executed the particular function, the risk determination module 208 may reduce the veracity of the device attributes obtained from the user interface application 112. In some embodiments, the risk analysis module 132 may still generate a device fingerprint for the user device 110, but may indicate to the interface server 134 that the device fingerprint may not be trustworthy. Indication of trustworthiness may be binary, i.e., yes or no, 1 or 0, or it may be more granular, such as from 1 to 10, where the latter indication would be based on how close or far the estimated time or number of cycles is to a threshold. In some embodiments, the risk determination module 208 may generate a veracity score for the device fingerprint based on an extent of deviation of the estimated time from the clean benchmark. The risk determination module 208 may determine a 100% veracity score when the estimated time matches the clean benchmark of the benchmark profile 212. However, when the estimated time does not match the clean benchmark, the risk determination module 208 may reduce the veracity score based on an amount (e.g., a percentage) that the estimated time deviates from the clean benchmark. The risk analysis module 132 may then send the device fingerprint and the veracity score to the interface server 134 for the interface server 134 to process the transaction request. The interface server 134 may process the transaction request according to the risk level assigned to the transaction request, the device fingerprint, and the veracity score.

If it is determined (at the step 335) that the estimated time matches a malicious profile, the process 300 adjusts (at step 340) the risk level based on the matched profile. For example, if the extension detection module 206 determines that the estimated time matches one of the malicious extension benchmarks, the risk determination module 208 may determine the malicious addon or extension corresponding to the malicious extension benchmark, and may adjust the risk level of the transaction request based on the matched malicious addon or extension. For example, the risk determination module 208 may adjust the risk level (e.g., increase the risk level) of the transaction request based on a frequency of the malicious addon or extension being used to conduct fraudulent activities in the past, a time (e.g., a recentness) when the malicious addon or extension was first detected, or a number of fraudulent transactions conducted by devices having the malicious addon or extension. In some embodiments, the risk analysis manager 202 may still generate a device fingerprint for the user device 110 based on the device attributes obtained from the user interface application 112. However, the risk determination module 208 may assign a veracity score to the device fingerprint based on the matched malicious addon or extension. For example, if the risk determination module 208 determines that the matched malicious addon or extension is designed to spoof device attributes (e.g., overwrite the API calls of the user interface application 112 to provide fake device attributes), the risk determination module 208 may substantially reduce the veracity score assigned to the device fingerprint (e.g., 0%, 5%, etc.). However, if the risk determination module 208 determines that the matched malicious addon or extension is designed to perform other functions, the risk determination module 208 may not reduce the veracity score (or may reduce slightly the veracity score), for example, by assigning a veracity score of 90% or 80%. The risk analysis module 132 may provide the risk level, the device fingerprint, and the veracity score to the interface server 134 such that the interface server 134 may process the transaction request based on the risk level, the device fingerprint, and the veracity score.

In some embodiments, in addition to determining device attributes and/or assessing a veracity of the device attributes of a computer device, the methods and systems disclosed herein may also be used to detect a presence of malware on a computer device. Malware is additional software code installed on a computer device (usually unintentionally by a user of the computer device) that performs additional functionalities on the computer device, such as collecting data (e.g., keystrokes, website data, browser history, etc.) and transmitting the collected data to remote devices. Thus, by detecting that the computer device uses more processing cycles (or takes more time) than it should in performing a specific task, the presence of malware can be detected. For example, a database, such as the database 210, may store benchmark profiles for different computer configurations. Each benchmark profile may also store a clean benchmark that indicates the amount of time that a device according to the corresponding computer configuration should take in performing a specific task (e.g., executing a particular computer function). The benchmark profile may also store one or more malware benchmarks, where each malware benchmark indicates the amount of time that the device would take in performing the specific task if a corresponding malware is installed on the device. As such, a computer device may be caused to perform the specific task and measure the amount of time it took to perform the specific task in the same manner as described herein, and the measured time may be compared against the benchmarks to determine whether any (or which) malware is present on the device.

Figure 5:
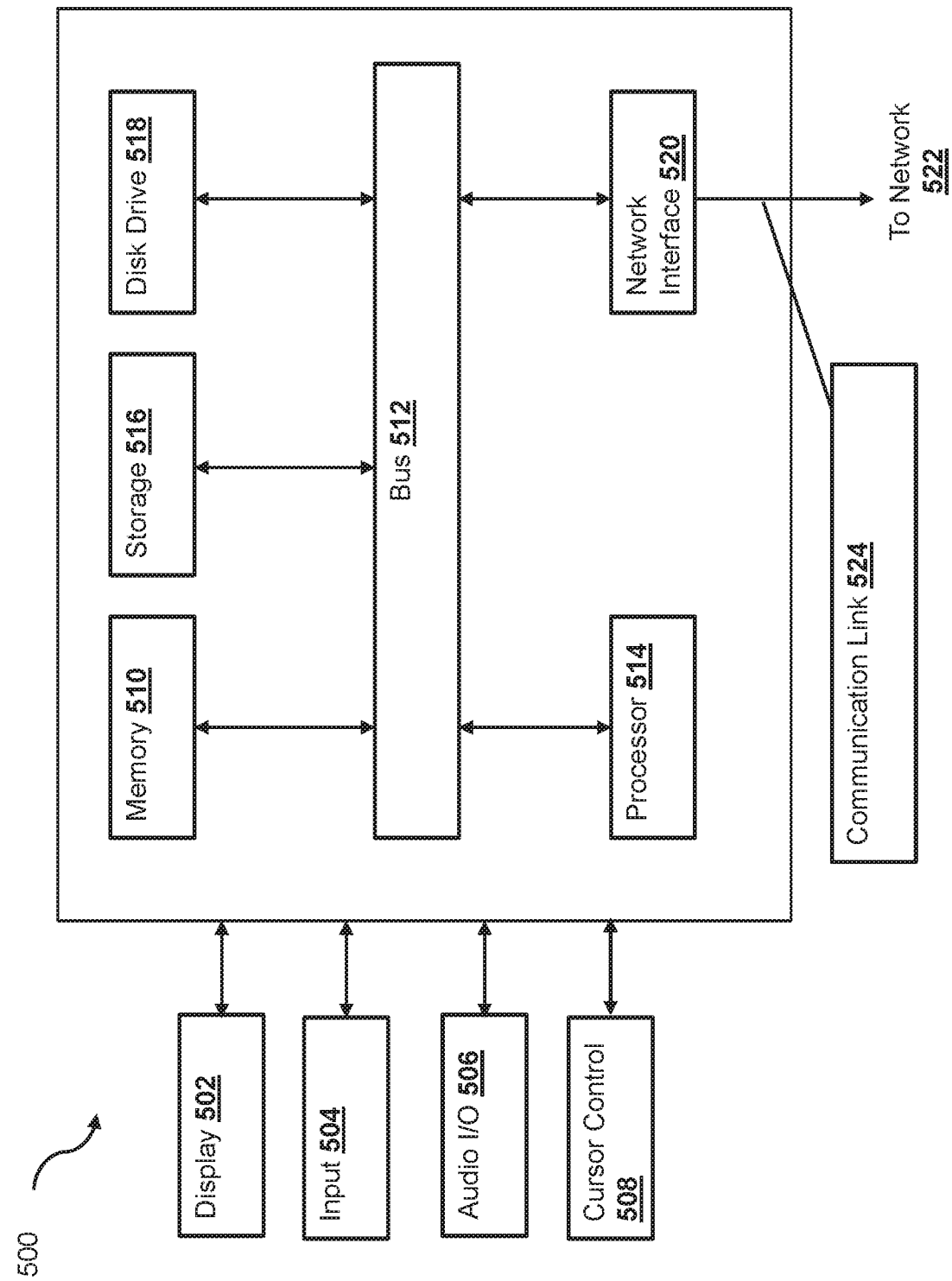
FIG. 5 is a block diagram of a system for implementing a device according to an embodiment of the present disclosure.

FIG. 5 is a block diagram of a computer system 500 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 500 in a manner as follows.

The computer system 500 includes a bus 512 or other communication mechanism for communicating information data, signals, and information between various components of the computer system 500. The components include an input/output (I/O) component 504 that processes a user (i.e., sender, recipient, service provider) action, such as selecting keys from a keypad/keyboard, selecting one or more buttons or links, etc., and sends a corresponding signal to the bus 512. The I/O component 504 may also include an output component, such as a display 502 and a cursor control 508 (such as a keyboard, keypad, mouse, etc.). The display 502 may be configured to present a login page for logging into a user account or a checkout page for purchasing an item from a merchant. An optional audio input/output component 506 may also be included to allow a user to use voice for inputting information by converting audio signals. The audio I/O component 506 may allow the user to hear audio. A transceiver or network interface 520 transmits and receives signals between the computer system 500 and other devices, such as another user device, a merchant server, or a service provider server via network 522. In one embodiment, the transmission is wireless, although other transmission mediums and methods may also be suitable. A processor 514, which can be a micro-controller, digital signal processor (DSP), or other processing component, processes these various signals, such as for display on the computer system 500 or transmission to other devices via a communication link 524. The processor 514 may also control transmission of information, such as cookies or IP addresses, to other devices.

The components of the computer system 500 also include a system memory component 510 (e.g., RAM), a static storage component 516 (e.g., ROM), and/or a disk drive 518 (e.g., a solid-state drive, a hard drive). The computer system 500 performs specific operations by the processor 514 and other components by executing one or more sequences of instructions contained in the system memory component 510. For example, the processor 514 can perform the device attributes determination functionalities described herein according to the processes 300 and 400.

Logic may be encoded in a computer readable medium, which may refer to any medium that participates in providing instructions to the processor 514 for execution. Such a medium may take many forms, including but not limited to, non-volatile media, volatile media, and transmission media. In various implementations, non-volatile media includes optical or magnetic disks, volatile media includes dynamic memory, such as the system memory component 510, and transmission media includes coaxial cables, copper wire, and fiber optics, including wires that comprise the bus 512. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 500. In various other embodiments of the present disclosure, a plurality of computer systems 500 coupled by the communication link 524 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
    a non-transitory memory; and
    one or more hardware processors coupled with the non-transitory memory and configured to read instructions from the non-transitory memory to cause the system to perform operations comprising:
        receiving a transaction request from an application running on a user device;
        transmitting, to the user device, code that causes the application running on the user device to perform a function as part of processing the transaction request;
        determining a computer configuration of the user device based on device attributes of the user device, wherein the computer configuration comprises a computer processor configuration;
        determining, based on the computer processor configuration, a processor cycle benchmark associated with performing the function by the user device, wherein the processor cycle benchmark is determined based on one or more simulations of performing the function on a second device having the computer processor configuration;
        estimating a number of processor cycles used by the user device for the performing the function;
        comparing the estimated number of processor cycles used by the user device against the processor cycle benchmark; and
        determining a risk associated with authorizing the transaction request based on the comparing.

2. The system of claim 1, wherein the code is embedded within a webpage transmitted to the user device.

3. The system of claim 2, wherein the code comprises an application programming interface (API) call associated with a web browser and a timer configured to determine a time duration for the user device to execute the API call.

4. The system of claim 1, wherein the code transmitted to the user device causes the user device to iteratively execute the function for a number of times.

5. The system of claim 4, wherein the operations further comprise determining the number of times for the user device to iteratively execute the function based on at least one of a type of transaction associated with the transaction request, an amount associated with the transaction request, a location of the user device, or a user profile associated with a user of the user device.

6. The system of claim 1, wherein the operations further comprise authorizing the transaction request based on the determined risk.

7. The system of claim 1, wherein the operations further comprise:
    determining that the estimated number of processor cycles deviates from the processor cycle benchmark by a predetermined threshold; and
    increasing a risk level associated with the transaction request based on the determining that the estimated number of processor cycles deviates from the processor cycle benchmark by the predetermined threshold.

8. The system of claim 1, wherein the processor cycle benchmark is a particular processor cycle benchmark, and wherein the operations further comprise:
    determining an application type of the application used by the user device to perform the function; and
    selecting, from a plurality of processor cycle benchmarks corresponding to the computer processor configuration, the particular processor cycle benchmark based on the application type of the application, wherein the plurality of processor cycle benchmarks further corresponds to a plurality of different application types comprising the application type of the application.

9. A method comprising:
    receiving, by one or more hardware processors, a transaction request from an application running on a user device;
    transmitting, to the user device, code comprising an application programming interface (API) call associated with the application that causes the application to perform a function as part of processing the transaction request;
    determining a computer processor configuration of the user device based on device attributes of the user device;
    determining, by the one or more hardware processors and based on the computer processor configuration, a benchmark associated with executing the function by the user device, wherein the benchmark is determined based on one or more simulations of performing the function on a second device having the computer processor configuration;
    estimating a time duration used by the application of the user device for the executing the function;
    comparing the estimated time duration against the benchmark; and
    determining a risk associated with authorizing the transaction request based on the comparing.

10. The method of claim 9, wherein the code causes the application to iteratively perform the function a number of times, and wherein the method further comprises determining the number of times for the user device to iteratively perform the function based on at least one of a type of transaction associated with the transaction request, an amount associated with the transaction request, a location of the user device, or a user profile associated with a user of the user device.

11. The method of claim 9, further comprising:
    determining that an extension to a user interface application is installed on the user device based on an extent that the estimated time deviates from the benchmark; and
    in response to determining that the extension to the user interface application is installed on the user device, increasing the risk associated with authorizing the transaction request.

12. The method of claim 9, wherein the device attributes are first device attributes, wherein the function is associated with obtaining second device attributes of the user device, and wherein the method further comprises determining a veracity of the second device attributes based on the estimated time.

13. The method of claim 12, further comprising generating a device fingerprint of the user device based on the first and second device attributes.

14. The method of claim 9, wherein the device attributes are first device attributes, wherein the function is associated with obtaining second device attributes of the user device, and wherein the second device attributes comprise at least one of an Internet Protocol address of the user device, a location of the user device, a screen resolution of a display of the user device, an identifier of the user device, or an operating system running on the user device.

15. A non-transitory machine-readable medium having stored thereon machine-readable instructions executable to cause a machine to perform operations comprising:
   receiving a transaction request from a user device;
   transmitting, to the user device, code that causes the user device to perform a function as part of processing the transaction request;
   determining a computer configuration of the user device based on device attributes of the user device, wherein the computer configuration comprises a computer processor configuration;
   determining, based on the computer processor configuration, a processor cycle benchmark associated with performing the function by the user device, wherein the processor cycle benchmark is determined based on one or more simulations of performing the function on a second device having the computer processor configuration;
   estimating a number of processor cycles used by the user device for the performing the function;
   comparing the estimated number of processor cycles used by the user device against the processor cycle benchmark; and
   determining a risk associated with authorizing the transaction request based on the comparing.

16. The non-transitory machine-readable medium of claim 15, wherein the processor cycle benchmark is associated with a malicious extension installable on the user device, and wherein the operations further comprise:
   determining that the malicious extension was installed on the user device based on the comparing; and
   increasing a risk level associated with the transaction request based on the determining that the malicious extension was installed on the user device.

17. The non-transitory machine-readable medium of claim 15, wherein the operations further comprise:
   determining that a malware is installed on the user device based on the comparing; and
   transmitting, to the user device, a notification indicating that the malware is installed on the user device.

18. The non-transitory machine-readable medium of claim 15, wherein the transaction request comprises at least one of a login request, a payment request, a content access request, or a fund transfer request.

19. The non-transitory machine-readable medium of claim 15, wherein the function is associated with obtaining information regarding at least one of a version of an application used by the user device for transmitting the transaction request, a screen resolution of the user device, or an operating system used by the user device.

20. The non-transitory machine-readable medium of claim 15, wherein the code comprises an application programming interface (API) call associated with the function, and a timer configured to determine a time duration for the user device to execute the API call.

* * * * *